US012754730B2

(12) United States Patent
Kouge

(10) Patent No.: US 12,754,730 B2
(45) Date of Patent: Oct. 6, 2026

(54) SOFTWARE UPDATE SERVER, STORAGE MEDIUM, AND SOFTWARE UPDATE METHOD

(71) Applicant: TOYOTA JIDOSHA KABUSHIKI KAISHA, Toyota (JP)

(72) Inventor: Naoki Kouge, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 18/632,905

(22) Filed: Apr. 11, 2024

(65) Prior Publication Data

US 2024/0411545 A1 Dec. 12, 2024

(30) Foreign Application Priority Data

Jun. 12, 2023 (JP) ................................ 2023-096038

(51) Int. Cl.
*G06F 8/65* (2018.01)

(52) U.S. Cl.
CPC ..................................... *G06F 8/65* (2013.01)

(58) Field of Classification Search
CPC .................................. G06F 8/65; G06F 11/36
See application file for complete search history.

(56) References Cited

U.S. PATENT DOCUMENTS

2014/0156992 A1* 6/2014 Medin .................. H04L 63/123 713/168
2018/0095745 A1* 4/2018 Mine .................. G06F 11/3698
2021/0157570 A1* 5/2021 Harata .................... B60R 16/02
2022/0222054 A1 7/2022 Sakai
2023/0082123 A1 3/2023 Yamamoto et al.
2024/0256259 A1 8/2024 Yoshimi et al.

FOREIGN PATENT DOCUMENTS

JP 2018-055645 A 4/2018
JP 2022-109039 A 7/2022
JP 2023-043528 A 3/2023
WO 2023/053623 A1 4/2023

* cited by examiner

*Primary Examiner* — Duy Khuong T Nguyen
(74) *Attorney, Agent, or Firm* — Oliff PLC

(57) ABSTRACT

A software update server includes an execution device and a storage device. The storage device stores campaign information including information specifying a target vehicle for a software update process, and information specifying update software to be applied to a control device mounted on the target vehicle. The storage device stores accompanying information indicating whether there is a defect in the update software itself for each piece of the update software. The execution device stores the accompanying information in the storage device based on an input from outside. When the accompanying information indicates that there is a defect in the update software itself, the execution device prohibits the update process according to the campaign information for the campaign information specifying the update software having a defect.

8 Claims, 3 Drawing Sheets

SOFTWARE UPDATE SERVER, STORAGE MEDIUM, AND SOFTWARE UPDATE METHOD

CROSS-REFERENCE TO RELATED APPLICATION

This application claims priority to Japanese Patent Application No. 2023-096038 filed on Jun. 12, 2023, incorporated herein by reference in its entirety.

BACKGROUND

1. Technical Field

The present disclosure relates to a software update server, a storage medium, and a software update method.

2. Description of Related Art

Japanese Unexamined Patent Application Publication No. 2022-109039 (JP 2022-109039 A) describes a software update system including an update server for distributing software and a vehicle. The vehicle includes a master device and a plurality of control devices. The update server transmits a campaign notification to the master device of the vehicle when executing update of software for the control device of the vehicle. The master device acquires the campaign notification, and executes a process related to the update of the software for the control device when an approval for the update of the software is obtained from a user of the vehicle.

SUMMARY

In a software update system such as that according to JP 2022-109039 A, there is a possibility that a defect such as a bug exists in new software for update. When there is a defect in the software itself, it is necessary to immediately suppress the software being applied to each vehicle.

In order to address the above issue, there is provided a software update server including an execution device and a storage device, in which the storage device stores campaign information including information specifying a target vehicle for a software update process, and information specifying update software to be applied to a control device mounted on the target vehicle, and accompanying information indicating whether there is a defect in the update software itself for each piece of the update software; and the execution device is configured to store the accompanying information in the storage device based on an input from outside, and when the accompanying information indicates that there is a defect in the update software itself, prohibit the update process according to the campaign information for the campaign information specifying the update software having a defect.

In order to address the above issue, there is provided a storage medium storing a software update program for an update server including an execution device and a storage device, in which:

the storage device stores campaign information including information specifying a target vehicle for a software update process, and information specifying update software to be applied to a control device mounted on the target vehicle, and accompanying information indicating whether there is a defect in the update software itself for each piece of the update software; and the execution device is configured to store the accompanying information in the storage device based on an input from outside, and when the accompanying information indicates that there is a defect in the update software itself, prohibit the update process according to the campaign information for the campaign information specifying the update software having a defect.

In order to address the above issue, there is provided a software update method for an update server including an execution device and a storage device, in which: the storage device stores campaign information including information specifying a target vehicle for a software update process, and information specifying update software to be applied to a control device mounted on the target vehicle, and accompanying information indicating whether there is a defect in the update software itself for each piece of the update software; and the execution device is configured to store the accompanying information in the storage device based on an input from outside, and when the accompanying information indicates that there is a defect in the update software itself, prohibit the update process according to the campaign information for the campaign information specifying the update software having a defect.

According to the above configuration, when there is a defect such as a bug in the update software, the update process according to all the campaign information specifying the update software is prohibited. Thus, when an administrator of the update server, etc. inputs the accompanying information, for example, it is possible to collectively suppress the update software having a defect being applied to the control device of each vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of the Update System

Hereinafter, an embodiment of the present disclosure will be described with reference to FIGS. 1 to 5. First, a schematic configuration of an update system US will be described.

Figure 1:
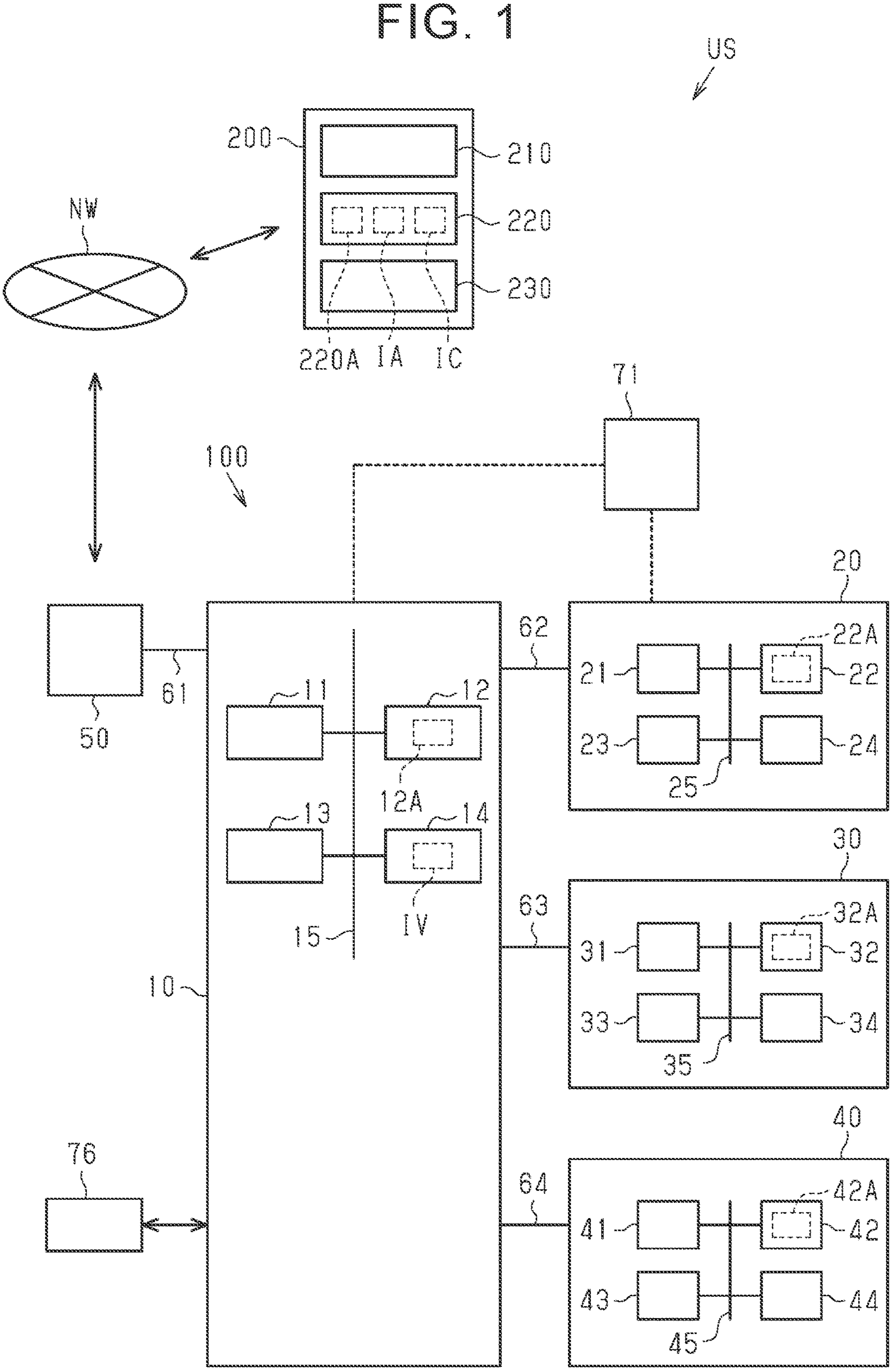
FIG. 1 is a schematic diagram of an update system.

As shown in of FIG. 1, the update system US includes a plurality of vehicles 100. The vehicle 100 is, for example, an automobile owned by a user. It should be noted that in of FIG. 1, only one vehicle 100 is represented and illustrated.

The vehicles 100 include a central ECU 10, a powertrain ECU 20, a braking ECU 30, an advanced driving support ECU 40, and a DCM 50. The vehicle 100 also includes a first external bus 61, a second external bus 62, a third external bus 63, and a fourth external bus 64. Note that ECU is an abbreviation for an electronic control unit. In addition, "DCM" is an abbreviation for Data Communication Module. In the present embodiment, each of the powertrain ECU 20, the braking ECU 30, and the advanced driving support ECU 40 is an exemplary control device in which software is updated.

The central ECU 10 performs overall control of the entire vehicle 100. The central ECU 10 includes CPU 11, ROM 12, RAM 13, storages 14, and inner busses 15. The inner bus 15 connects CPU 11, ROM 12, RAM 13 and the storage 14 to each other in a communicable manner. ROM 12 stores various programs and various data in advance. In addition, ROM 12 stores in advance master program 12A to be executed at the time of updating the software as one of various programs. RAM 13 are volatile memories. RAM 13 temporarily stores various programs and various data. CPU 11 executes various processes by reading a ROM 12 program using RAM 13 as a working area. CPU 11 reads the master program 12A to execute various processes related to the software-updating process of the control device. That is, the central ECU 10 functions as a master device for updating the software of the control device.

The storage 14 can store various programs and various types of data. The storage 14 is an electrically rewritable nonvolatile memory. For example, the storage 14 is a NAND flash memory.

The storage 14 stores the vehicle-configuration-information IV in advance. The vehicle configuration information IV includes software information and vehicle identification information. Here, the software information is information indicating the software for each ECU and the version of the software. The vehicle identification information is information indicating the type and identification number of the vehicle 100.

DCM 50 is connected to the central ECU 10 via a first external bus 61. DCM 50 is capable of wirelessly communicating with devices external to the vehicles 100 via a communication network NW. Therefore, the central ECU 10 is capable of wirelessly communicating with devices outside the vehicles 100 via the first external bus 61 and DCM 50.

The powertrain ECU 20 is capable of communicating with the central ECU 10 via a second external bus 62. The powertrain ECU 20 executes various processes for controlling an engine, a transmission, and the like (not shown). The powertrain ECU 20 includes CPU 21, ROM 22, RAM 23, a storage 24, and inner busses 25. The inner busses 25 communicatively connect CPU 21, ROM 22, RAM 23 and the storage 24 to each other. ROM 22 stores various programs and various data in advance. ROM 22 stores control program 22A in advance as one of various programs. ROM 22 is a so-called Erasable Programmable Read Only Memory (EPROM). That is, the control program 22A stored in ROM 22 can be updated. ROM 22 is a so-called two-sided ROM having two storage areas. In other words, in ROM 22, even when ROM 22 is in the on state, the software can be installed in a storage area different from the storage area of the data used in the on state. RAM 23 are volatile memories. RAM 23 temporarily stores various programs and various data. CPU 21 executes various processes by reading a ROM 22 program using RAM 23 as a working area. CPU 21 reads the control program 22A to execute various processes for controlling the engine, the transmission, and the like.

The storage 24 can store various programs and various types of data. The storage 24 is an electrically rewritable nonvolatile memory. For example, the storage 24 is a NOR flash memory.

The braking ECU 30 can communicate with the central ECU 10 via a third external bus 63. The braking ECU 30 controls a brake device (not shown). The internal configuration of the braking ECU 30 is similar to the internal configuration of the powertrain ECU 20. That is, the braking ECU 30 includes a CPU 31, ROM 32, RAM 33, a storage 34, and an inner bus 35. ROM 32 stores control program 32A in advance as one of various programs. CPU 31 executes various processes for controlling the braking device by reading the control program 32A.

The advanced driving support ECU 40 can communicate with the central ECU 10 via the fourth external bus 64. The advanced driving support ECU 40 realizes various types of driving support by executing various types of application software. Note that the various types of application software include software for following while keeping a constant inter-vehicle distance with a preceding vehicle traveling ahead of the vehicle 100, and software for automatically braking in order to reduce damage caused by a collision with the vehicle 100. The internal configuration of the advanced driving support ECU 40 is the same as the internal configuration of the powertrain ECU 20. That is, the advanced driving support ECU 40 includes a CPU 41, ROM 42, RAM 43, a storage 44, and an inner bus 45. ROM 42 stores control program 42A in advance as one of various programs. CPU 41 reads the control program 42A to execute various processes for realizing the above-described various types of driving support. Each of the ROM, the RAM, and the storage is an example of a storage medium.

As shown in of FIG. 1, the vehicles 100 include a device group including a plurality of devices. Examples of these devices are a secondary battery 71 and a display 76. The secondary batteries 71 supply electric power to a central ECU 10, a powertrain ECU 20, a braking ECU 30, an advanced driving support ECU 40, a DCM 50, and the like. In FIG. 1, only the power path connecting the secondary battery 71 and the central ECU 10 and the power path connecting the secondary battery 71 and the powertrain ECU 20 are shown as representatives.

The display 76 can display various types of information. The display 76 is a so-called touch panel display. Accordingly, the user of the vehicle 100 can input various types of information via the display 76. That is, the display 76 functions as both an output device that outputs information to the user and an input device that receives information from the user.

The central ECU 10 displays various types of information on the display 76 by outputting a control signal to the display 76. In addition, the central ECU 10 acquires, from the display 76, information inputted by the user of the vehicle 100.

As shown in of FIG. 1, the update system US includes an update server 200. The update server 200 includes an execution device 210, a storage device 220, and a communication device 230. The communication device 230 can wirelessly communicate with an external device of the update server 200 via a communication network NW. The storage device 220 includes ROM that can only be read, volatile RAM that can be read and written, and non-volatile storages that can be read and written. The storage device 220 stores various programs and various data in advance. The storage device 220 stores an updated program 220A as one of various programs. The execution device 210 reads the update program 220A to realize various processes in the software update methods. An exemplary execution device 210 is a CPU.

Figure 2:
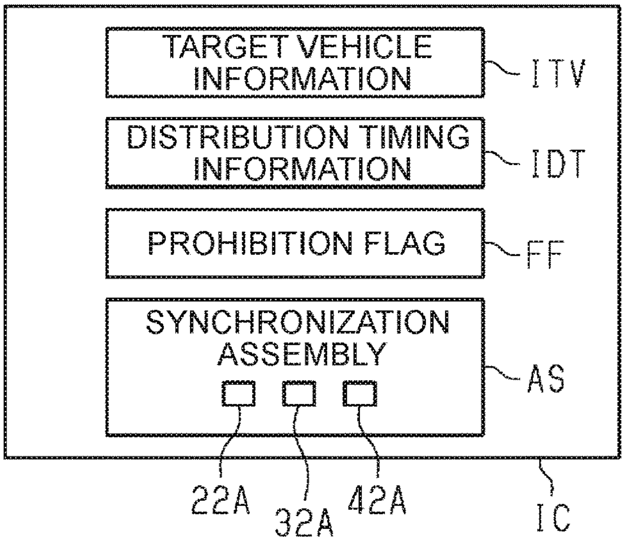
FIG. 2 is an explanatory view of campaign-information.

As shown in of FIG. 1, the storage device 220 stores a plurality of campaign-information IC as various types of data. The campaign information IC is information related to a campaign for updating the software of the control device mounted on the vehicle 100. In of FIG. 1, only one campaign-information IC is represented and illustrated. As shown in FIG. 2, the campaign information IC includes the target vehicle information ITV, the distribution time information IDT, the prohibition flag FF, and the synchronization assembly AS. The target vehicle information ITV is information for designating the vehicle 100 that is the target of the software updating process. For example, the target vehicle information ITV is information indicating identification numbers of a plurality of vehicles 100 such as "00001 to 10000". In the present embodiment, the target vehicle information ITV designates a plurality of vehicles 100 classified by the country in which the vehicle 100 is sold, the sales time of the vehicle 100, the vehicle type of the vehicle 100, and the like. In addition, the distribution time information IDT is information that defines a time at which the software is distributed for the software updating process. For example, the distribution time information IDT is information indicating a date and time such as "* year * month * date * time". The synchronization assembly AS is information specifying software to be updated simultaneously in the vehicles 100. That is, the synchronization assembly AS designates one or more software. Here, the software specified by the synchronization assembly AS is new software applied to the control device of the vehicle 100. Note that the software designated by the synchronization assembly AS is one or more of a control program 22A, a control program 32A, and a control program 42A of a newer version than the software stored in the vehicles 100. In the present embodiment, each of the software designated by the synchronization assembly AS corresponds to the updating software to be applied to the control device mounted on the vehicle 100. The storage device 220 stores a control program 22A, a control program 32A, and a control program 42A of a newer version than the software stored in the vehicles 100, separately from the campaign-information IC. The prohibition flag FF is a flag for prohibiting the updating process according to the campaign-information IC. In the present embodiment, the prohibition flag FF being ON indicates prohibition of the updating process corresponding to the campaign-information IC. The initial value of the prohibition flag FF is OFF.

As shown in of FIG. 1, the storage device 220 stores a plurality of accompanying information IA as various types of data. The storage device 220 stores a total of three accompanying information IA for each updating software, that is, corresponding to the control program 22A, the control program 32A, and the control program 42A. It should be noted that in FIG. 1, only one accompanying information IA is represented and illustrated. The accompanying information IA includes a defect information ID and a non-update information IN. The defect information ID is information indicating whether or not there is a defect in the corresponding updating software. Therefore, for example, the defect information ID of the accompanying information IA corresponding to the control program 22A indicates whether there is a defect in the control program 22A itself. The non-update information IN is information specifying non-update vehicles that must not update the corresponding update software. Therefore, for example, the non-update information IN of the accompanying information IA corresponding to the control program 22A is information specifying the non-update vehicles in which the control program 22A should not be updated. In addition, an example of a situation in which the non-update vehicle of the non-update information IN is designated is a situation in which the control program 22A does not conform to laws and regulations such as the country in which the vehicle 100 is used. For example, the non-update information IN is information indicating the identification numbers of the plurality of vehicles 100 such as "00001 to 10000". In the present embodiment, for example, each time the administrator of the update server 200 or the like inputs the accompanying information IA via the input device connected to the update server 200, the execution device 210 stores the input accompanying information IA in the storage device 220. In other words, the execution device 210 stores the accompanying information IA in the storage device 220 based on an external inputting.

Decision Control

Next, the determination control executed by the update server 200 will be described with reference to FIG. 3. This determination control is a control for determining whether or not the update server 200 prohibits the update process according to the campaign-information IC. In the present embodiment, each time the accompanying information IA of the storage device 220 is updated, the execution device 210 of the update server 200 executes the determination control for the updating software corresponding to the accompanying information IA.

Figure 3:
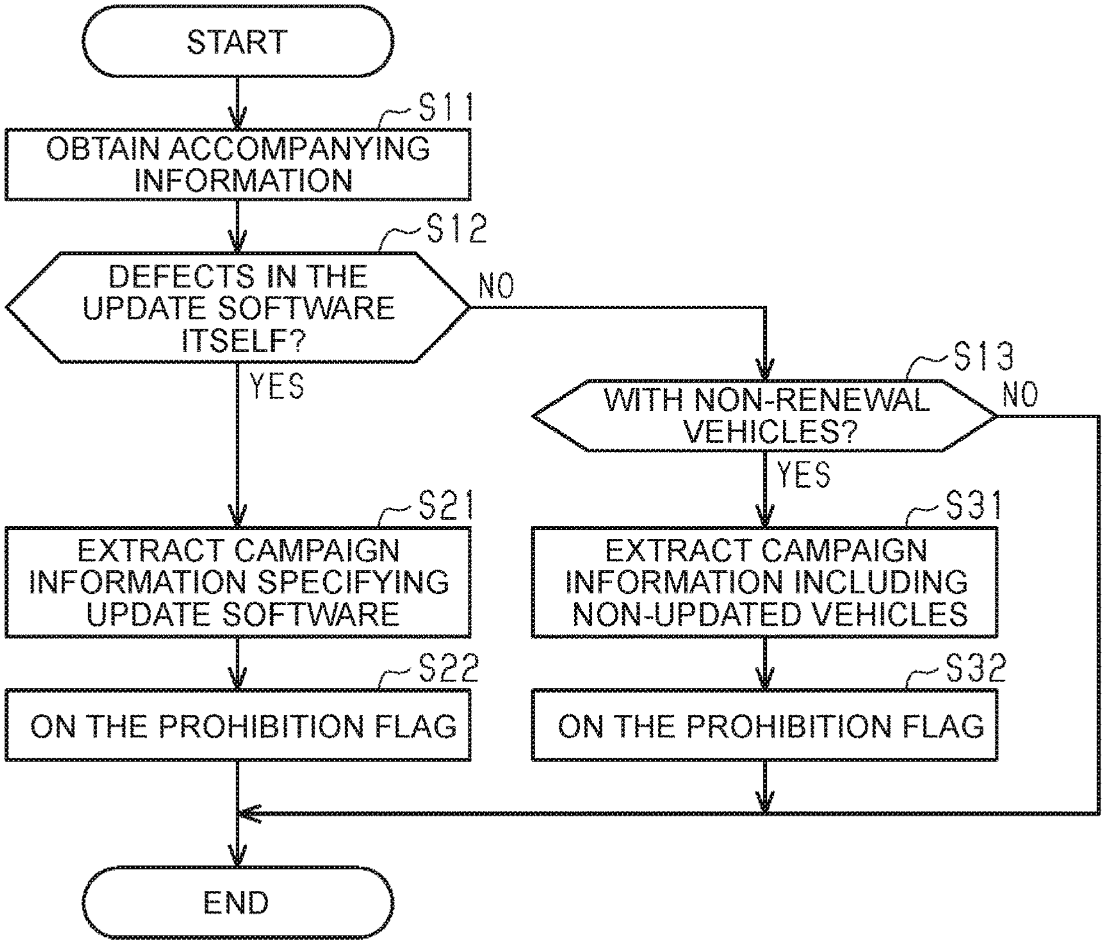
FIG. 3 is a flow chart illustrating decision control.

As shown in FIG. 3, when the determination control is started, the execution device 210 of the update server 200 executes S11 process. In S11, the execution device 210 of the update server 200 acquires the new accompanying information IA stored in the storage device 220. After S11, the execution device 210 advances the process to S12.

In S12, the execution device 210 determines whether or not there is a defect in the updating software corresponding to the accompanying information IA based on the defect information ID of the accompanying information IA. In S12, when the execution device 210 determines that the defect information ID of the accompanying information IA indicates that the updating software is defective (S12: YES), the execution device 210 advances the process to S21.

In S21, the execution device 210 extracts all the campaign information IC specifying the updating software having a defect among the plurality of campaign information IC stored in the storage device 220. Specifically, the execution device 210 extracts the campaign information IC specifying the updating software having the defect based on the synchronization assembly AS of the respective campaign information IC. After S21, the execution device 210 advances the process to S22.

In S22, the execution device 210 sets the prohibition flag FF to ON for the campaign-information IC extracted by S21. In other words, the execution device 210 sets the prohibition flag FF of the campaign information IC to ON for the campaign information IC specifying the updating software having the defect. After S22, the execution device 210 ends the current determination control.

On the other hand, in S12 described above, when the execution device 210 determines that the defect information ID of the accompanying information IA indicates that the updating software does not have a defect (S12: NO), the execution device 210 advances the process to S13.

In S13, the execution device 210 determines whether or not there is a non-update vehicle that should not update the update software corresponding to the accompanying information IA based on the non-update information IN of the accompanying information IA. In S13, when the execution device 210 determines that there are no non-update vehicles for which the update software should not be updated (S13: NO), the execution device 210 ends the current determination control.

On the other hand, when the execution device 210 determines in S13 that there are non-update vehicles for which the update software should not be updated (S13: YES), the execution device 210 advances the process to S31.

In S31, the execution device 210 extracts all the campaign information IC that designate the update software corresponding to the accompanying information IA and designate the non-update vehicles as the target of the update process from among the plurality of campaign information IC stored in the storage device 220. Specifically, the execution device 210 extracts the campaign information IC specifying the update software and specifying the non-update vehicle as the target of the update process based on the synchronization assembly AS and the target vehicle information ITV of the campaign information IC. At this time, the execution device 210 also sets the campaign information IC in which the vehicle 100 designated by the target vehicle information ITV of the campaign information IC and the non-update vehicle designated by the non-update information IN of the accompanying information IA partially overlap with each other, as the target of the extracting. After S31, the execution device 210 advances the process to S32.

In S32, the execution device 210 sets the prohibition flag FF to ON for the campaign-information IC extracted by S31. In other words, the execution device 210 sets the prohibition flag FF of the campaign information IC to ON for the campaign information IC that designates the update software and designates the non-update vehicles as the target of the update process. After S32, the execution device 210 ends the current determination control.

Acquisition Control

Next, referring to FIG. 4, acquisition control executed by the central ECU 10 of the update servers 200 and the vehicles 100 will be described. This acquiring control is a control for the update servers 200 to acquire the vehicle-configuration-information IV. In addition, the acquiring control is executed in parallel between the single update servers 200 and the central ECU 10 of the plurality of vehicles 100. In the present embodiment, the central ECU 10 of the vehicle 100 starts acquisition control every time the system of the vehicle 100 is activated.

Figure 4:
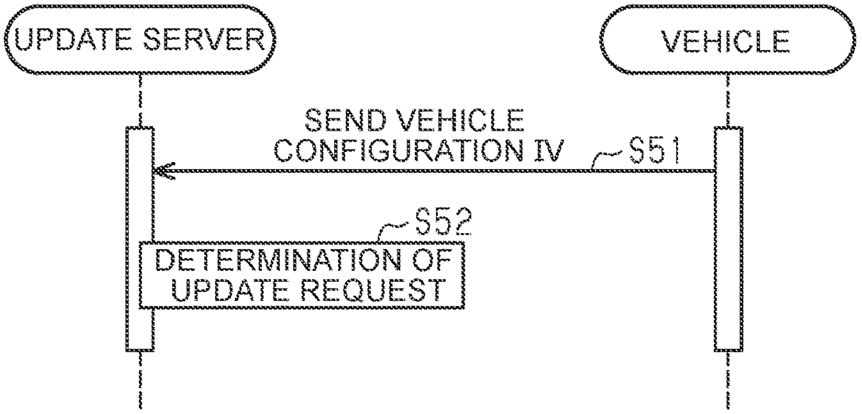
FIG. 4 is a sequential diagram showing acquisition control.

As shown in FIG. 4, when CPU 11 of the central ECU 10 starts the acquiring control, it executes S51 process. In S51, CPU 11 of the central ECU 10 transmits the vehicle-configuration-information IV to the update server 200. When the execution device 210 of the update server 200 acquires the vehicle configuration information IV, the execution device 210 of the update server 200 advances the process to S52.

In S52, the execution device 210 of the update server 200 determines, based on the vehicle configuration information IV, whether or not a software-update request for the vehicle 100 has occurred. For example, when the version of the control program 22A stored in the storage device 220 is newer than the version of the control program 22A of the vehicle 100, the execution device 210 of the update server 200 determines that a software update request has occurred for the vehicle 100. Note that the execution device 210 of the update server 200 executes an update control, which will be described later, on the assumption that a software update request has occurred for the vehicle 100 as a necessary condition. After S52, the execution device 210 of the update server 200 ends the current acquiring control.

Update Control

Next, referring to FIG. 5, update control executed by the central ECU 10 of the update servers 200 and the vehicles 100 will be described. This update control is a control related to the update of the software of the vehicle 100. This update control is executed in parallel between the single update servers 200 and the central ECU 10 of the plurality of vehicles 100.

In the present embodiment, when all of the following conditions (1) and (2) are satisfied, for example, the execution device 210 of the update server 200 executes the update control for the update software designated by the synchronization assembly AS of the campaign-information IC. In the following, a process when the update software designated by the synchronization assembly AS is a control program 22A is exemplified and the update control of the control program 22A is performed will be described.

Condition (1): In the acquisition control, a request for updating the software is generated for the vehicle 100 designated by the target vehicle information ITV of the campaign information IC.

Condition (2): The current time is after the time defined in the distribution time information IDT of the campaign information IC.

Figure 5:
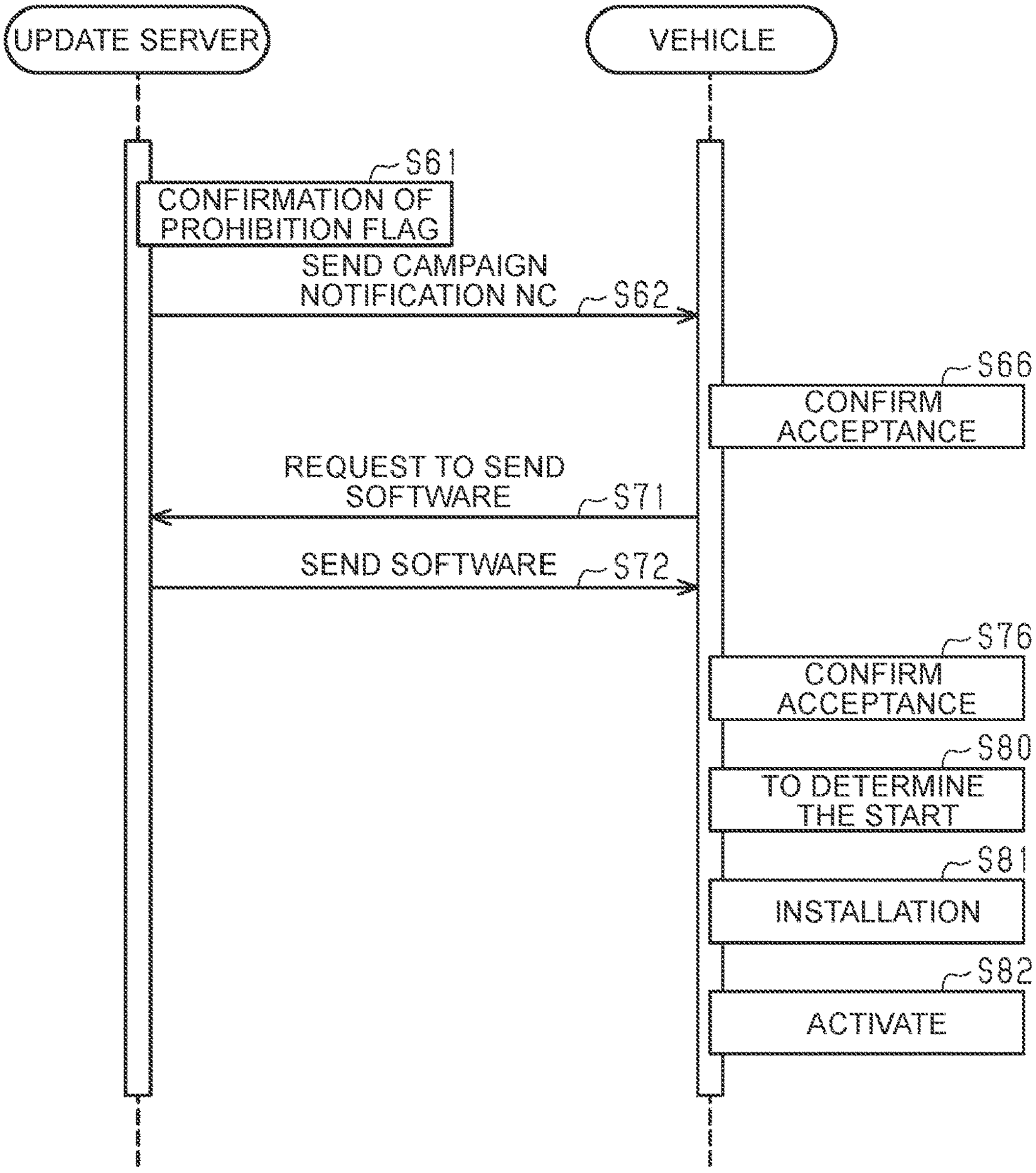
FIG. 5 is a sequential diagram showing of updating control.

As shown in of FIG. 5, when the updating control is started, the execution device 210 of the update server 200 executes S61 process. In S61, the execution device 210 of the update server 200 checks the prohibition flag FF of the campaign-information IC. When the prohibition flag FF is ON, the execution device 210 of the update server 200 ends the current update control without executing the process from S62 to S82. In other words, for the campaign information IC in which the prohibition flag FF is ON, the execution device 210 of the update server 200 prohibits the campaign notification NC from being transmitted in accordance with the campaign information IC. The campaign notification NC will be described later. On the other hand, when the prohibition flag FF is OFF, the execution device 210 of the update server 200 advances the process to S62.

In S62, the execution device 210 of the update server 200 transmits a campaign notification NC corresponding to the campaign information IC to the vehicles 100 in which the software update is requested. Here, the campaign notification NC notifies that the update software is applicable to the vehicles 100 that are the targets of the update process in the campaign information IC. Therefore, unless the execution device 210 transmits the campaign notification NC, the updating process of the updating software corresponding to the campaign notification NC is not performed. That is, as described above, when the prohibition flag FF is ON, the execution device 210 prohibits the campaign notification NC from being transmitted, thereby prohibiting the updating process of the updating software corresponding to the campaign information IC. In addition, the campaign notification NC includes information indicating the type of the updating software. In this embodiment, the information indicating the type of the update software is information indicating that the update software is the control program 22A of the powertrain ECU 20. The CPU 11 of the central ECU 10 proceeds to S66 if the CPU 11 of the central ECU 10 obtains the campaign notification NC.

In S66, CPU 11 of the central ECU 10 checks whether or not the user of the vehicle 100 is allowed to download a new control program 22A for updating the control program 22A.

Specifically, CPU 11 of the central ECU 10 displays an option on the display 76 as to whether or not to accept the downloading of the control program 22A by outputting a control signal to the display 76. Then, when the user of the vehicle 100 does not obtain the approval, CPU 11 of the central ECU 10 displays an option of whether or not to approve the downloading of the control program 22A at regular intervals. On the other hand, when an acceptance is obtained from the user of the vehicle 100, CPU 11 of the central ECU 10 advances the process to S71.

In S71, CPU 11 of the central ECU 10 sends a request to the update servers 200 to request the sending of the new control program 22A. When the execution device 210 of the update server 200 acquires the request signal, the execution device 210 of the update server 200 advances the process to S72.

In S72, the execution device 210 of the update server 200 transmits new control program 22A to the central ECU 10 as new software corresponding to the campaign notification NC. In other words, CPU 11 of the central ECU 10 downloads the new control program 22A from the update server 200. At this time, the CPU 11 of the central ECU 10 stores the new control program 22A in the storage 14 of the central ECU 10. After S72, CPU 11 of the central ECU 10 proceeds the process to S76.

In S76, CPU 11 of the central ECU 10 confirms whether or not the user of the vehicle 100 is allowed to install and activate a new control program 22A for updating the control program 22A. Specifically, CPU 11 of the central ECU 10 displays an option on the display 76 as to whether or not to allow the control program 22A to be installed and activated by outputting a control signal to the display 76. Then, when the user of the vehicle 100 does not obtain the approval, CPU 11 of the central ECU 10 displays an option of whether or not to approve the installation and activation of the control program 22A at regular intervals. On the other hand, when an acceptance is obtained from the user of the vehicle 100, CPU 11 of the central ECU 10 advances the process to S80.

In S80, CPU 11 of the central ECU 10 determines whether a predetermined starting condition is satisfied. Here, an example of the start condition is that the system of the vehicle 100 is in the off state. The system-off state of the vehicle 100 means a state in which no electric power is supplied to the respective ECUs except the central ECU 10. Therefore, the state in which the vehicle 100 is traveling and the accessory-on state in which the respective devices of the vehicle 100 can be used are in the on state. A state in which the vehicle 100 cannot travel is an off state. In S80, if the CPU 11 of the central ECU 10 determines that the starting condition is not satisfied, the CPU 11 of the central ECU 10 performs S80 process again.

On the other hand, in S80, when CPU 11 of the central ECU 10 determines that the starting condition is satisfied, CPU 11 of the central ECU 10 advances the process to S81.

In S81, CPU 11 of the central ECU 10 installs the new control program 22A stored in the storage 14 to the ROM 22 of the powertrain ECU 20. After S81, CPU 11 of the central ECU 10 proceeds the process to S82.

In S82, CPU 11 of the central ECU 10 activates the installed control program 22A. The activation here means that the installed control program 22A can be executed by switching a reference-address or the like for executing the control program 22A. After S82, CPU 11 of the central ECU 10 ends the current updating control.

Operation of this Embodiment

Assume that a problem such as a bug has occurred in the control program 22A, which is the updating software specified by the synchronization-assembly AS of the campaign-information IC. Under such circumstances, for example, when the administrator of the update server 200 or the like inputs the accompanying information IA corresponding to the control program 22A via the input device, the execution device 210 of the update server 200 stores the input accompanying information IA in the storage device 220. Then, as shown in of FIG. 3, the execution device 210 of the update server 200 executes the determination control for the update software corresponding to the updated accompanying-information IA. At this time, in S12, if the defect information ID of the accompanying information IA indicates that there is a defect in the updating software, the execution device 210 advances the process to S21. Then, in S21 and S22, the execution device 210 sets the prohibition flag FF of the campaign information IC to ON for the campaign information IC specifying the updating software having the defect. When the prohibition flag FF of the campaign-information IC is set to ON in this way, as shown in FIG. 5, even if the execution device 210 starts the update control, the execution device 210 ends the current update control without executing the process from S62 to S82. In other words, the execution device 210 of the update server 200 prohibits the updating process of the updating software according to the campaign information IC for the campaign information IC specifying the updating software having a defect.

Effect of this Embodiment (1) According to the present embodiment, when there is a defect such as a bug in the update software, the update process of the update software corresponding to all the campaign-information IC specifying the update software is prohibited. Therefore, when the administrator of the update server 200 or the like enters the accompanying information IA, it is possible to collectively prevent the update software having a defect from being applied to the control devices of the vehicles 100.

(2) For example, even in a case where the update software functions normally due to the absence of a bug or the like in the update software, the update software may not conform to the laws and regulations of the country in which the vehicle 100 is used. In this regard, in the determination control, the execution device 210 of the update server 200 sets the prohibition flag FF of the campaign information IC to ON for the campaign information IC that designates the update software and designates the non-update vehicles as the target of the update process. Therefore, even when there is no defect in the update software, the update processing of the update software according to the campaign information IC is prohibited for the campaign information IC specifying the non-update vehicle as the target of the update processing. With this, it is possible to suppress the application of the update software to the control device of the vehicle 100 that must not update the update software.

(3) In the update control, the execution device 210 of the update server 200 prohibits the update process of the update software in accordance with the campaign information IC by prohibiting the campaign notification NC from being transmitted in accordance with the campaign information IC. That is, not only is the transmission of the updating software in accordance with the campaign information IC performed in S72, but also the transmission of the campaign notification NC in accordance with the campaign information IC in S62 is not performed. Accordingly, even when the update process of the update software cannot be executed, it is possible to prevent the user of the vehicle 100 from making a misunderstanding as if the update software is applicable due to the campaign notification NC being transmitted.

Modifications

The present embodiment can be realized with the following modifications. The present embodiment and the following modifications can be combined with each other within a technically consistent range to be realized.

In the above embodiment, the determination control may be changed.

For example, S13 determination process may be omitted. As a specific example, if the possibility of designating the non-update vehicles as the non-update information IN of the accompanying information IA is relatively low, the effect is small even if S13 determination process is omitted. In this case, in a case where the execution device 210 determines in S12 that the defect information ID of the accompanying information IA indicates that the updating software does not have a defect (S12: NO), the execution device 210 may terminate the current determination control. That is, S31 and S32 processes can also be omitted. Further, the accompanying information IA may not include the non-update information IN.

In the above embodiment, the update control may be changed.

For example, S61 process may not be performed prior to S62 process. As a specific example, the execution device 210 of the update server 200 may execute S61 process after S71 and prior to S72. In this configuration, when the prohibition flag FF is ON, the execution device 210 of the update server 200 ends the current update control without executing the process from S72 to S82. In other words, when the prohibition flag FF is ON, the execution device 210 prohibits the updating of the updating software in accordance with the campaign information IC by prohibiting the updating of the updating software in accordance with the campaign information IC in S72.

What is claimed is:

1. A software update server that manages distribution of software updates for electronic control units installed in vehicles, the software update server comprising:
- a memory in which is stored:
  - campaign information including (1) information specifying a target vehicle for performance of a software update process, and (2) information specifying update software to be applied to the electronic control unit installed in the target vehicle by the software update process,
  - distribution timing information indicating a time for distribution of the update software by the software update process, and
  - accompanying information including defect information indicating whether there is a defect in the update software itself for each piece of the update software; and
- a processor configured to:
  - store the accompanying information in the memory based on an input from outside the software update server, and
  - in response to receipt of a request for updating generated by the target vehicle and after confirming that a current time is after the time for distribution of the update software indicated by the distribution timing information stored in the memory;
    - transmit the update software to the target vehicle via a wireless communication device, by executing the software update process, when the accompanying information does not indicate that there is the defect in the update software itself, and
  - when the accompanying information includes the defect information indicating that there is the defect in the update software itself, prohibit execution of the software update process by not informing the target vehicle of the campaign information and not transmitting the update software to the target vehicle.

2. The software update server according to claim 1, wherein:
- the accompanying information includes information specifying a non-update vehicle not to be updated to the update software for each piece of the update software; and
- the processor is configured to, even when the defect information indicates that there is no defect in the update software itself, prohibit the execution of the update process according to the campaign information for the campaign information specifying the update software and specifying the non-update vehicle as the target vehicle.

3. The software update server according to claim 1, wherein the processor is configured to:
- transmit a campaign notification indicating that the update software is applicable to the target vehicle in the campaign information;
- after transmitting the campaign notification, transmit the update software to the target vehicle to which the campaign notification has been transmitted; and
- prohibit the execution of the update process by prohibiting transmission of the campaign notification to the target vehicle.

4. The software update server according to claim 1, wherein:
- the accompanying information includes non-update information specifying, for each piece of the update software, a non-update vehicle that is not to be updated with the update software because the piece of update software does not conform to laws and regulations of the country in which the non-update vehicle is used; and
- the processor is configured to, even when the defect information indicates that there is no defect in the update software itself, prohibit the execution of the software update process for the non-update vehicle as the target vehicle.

5. A non-transitory storage medium storing a software update program for execution by an update server including a processor and a memory, the software update program causing the update server to manage distribution of software updates for electronic control units installed in vehicles the software update program causing the update server to:
- store, in the memory:
  - campaign information including (1) information specifying a target vehicle for performance of a software update process, and (2) information specifying update software to be applied to the electronic control unit installed in the target vehicle by the software update process,
  - distribution timing information indicating a time for distribution of the update software by the software update process, and accompanying information including defect information indicating whether there is a defect in the update software itself for each piece of the update software; and cause the processor to execute the steps of:

storing the accompanying information including the defect information in the memory based on an input from outside the update server, and in response to receipt of a request for updating generated by the target vehicle and after confirming that a current time is after the time for distribution of the update software indicated by the distribution timing information stored in the memory:

transmitting the update software to the target vehicle via a wireless communication device, by executing the software update process, when the accompanying information does not indicate that there is the defect in the update software itself, and when the accompanying information includes the defect information indicating that there is the defect in the update software itself, prohibiting execution of the software update process by not informing the target vehicle of the campaign information and not transmitting the update software to the target vehicle.

6. The non-transitory storage medium according to claim 5, wherein:

the accompanying information stored in the memory includes non-update information specifying, for each piece of the update software, a non-update vehicle that is not to be updated with the update software because the piece of update software does not conform to laws and regulations of the country in which the non-update vehicle is used; and the program causes the processor to, even when the defect information indicates that there is no defect in the update software itself, prohibit the execution of the software update process for the non-update vehicle as the target vehicle.

7. A software update method executed by an update server including a processor and a memory, the software update method managing distribution of software updates for electronic control units installed in vehicles, the method including:

storing, in the memory;

campaign information including (1) information specifying a target vehicle for performance of a software update process, and (2) information specifying update software to be applied to the electronic control unit installed in the target vehicle by the software update process, distribution timing information indicating a time for distribution of the update software by the software update process, and accompanying information including defect information indicating whether there is a defect in the update software itself for each piece of the update software; and the processor performing the steps of:

storing the accompanying information including the defect information in the memory based on an input from outside the update server, and in response to receipt of a request for updating generated by the target vehicle and after confirming that a current time is after the time for distribution of the update software indicated by the distribution timing information stored in the memory;

transmitting the update software to the target vehicle via a wireless communication device, by executing the software update process, when the accompanying information does not indicate that there is the defect in the update software itself, and when the accompanying information includes the defect information indicating that there is the defect in the update software itself, prohibiting execution of the software update process by not informing the target vehicle of the campaign information and not transmitting the update software to the target vehicle.

8. The software update method according to claim 7, wherein:

the accompanying information stored in the memory includes non-update information specifying, for each piece of the update software, a non-update vehicle that is not to be updated with the update software because the piece of update software does not conform to laws and regulations of the country in which the non-update vehicle is used; and even when the defect information indicates that there is no defect in the update software itself, the processor prohibit the execution of the software update process for the non-update vehicle as the target vehicle.

* * * * *